United States Patent
Xu

(10) Patent No.: US 8,154,868 B2
(45) Date of Patent: Apr. 10, 2012

(54) ELECTRONIC DEVICE

(75) Inventor: Zhong Xu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 130 days.

(21) Appl. No.: 12/762,345

(22) Filed: Apr. 18, 2010

(65) Prior Publication Data

US 2011/0157819 A1    Jun. 30, 2011

(51) Int. Cl.
*H05K 5/00* (2006.01)
*G02F 1/1345* (2006.01)
*G06F 3/02* (2006.01)

(52) U.S. Cl. ......... 361/679.55; 361/679.56; 361/679.57; 361/679.58; 361/679.59; 361/679.26; 361/679.27; 349/149; 345/168; 248/917; 248/918; 248/919; 248/920; 248/921

(58) Field of Classification Search .......... 361/679.01–679.45, 679.55–679.59, 361/724–727; 345/156, 157, 168, 169; 312/223.1, 312/223.2, 223.3; 455/575.1, 575.3, 575.4, 455/575.8

See application file for complete search history.

(56) References Cited

U.S. PATENT DOCUMENTS

| | | | |
|---|---|---|---|
| 2003/0025063 A1* | 2/2003 | Chen et al. | 248/918 |
| 2005/0061937 A1* | 3/2005 | Kim | 248/274.1 |
| 2007/0087596 A1* | 4/2007 | Chung et al. | 439/131 |
| 2007/0176891 A1* | 8/2007 | Sano et al. | 345/156 |

* cited by examiner

*Primary Examiner* — Robert J Hoffberg
*Assistant Examiner* — Jerry Wu
(74) *Attorney, Agent, or Firm* — Altis Law Group, Inc.

(57) ABSTRACT

An electronic device includes a cover, a body, and a sliding mechanism connecting the cover to the body. The sliding mechanism includes a slidable plate and at least one telescoping member. The cover is rotatably coupled to ends of the at least one telescoping member. Other ends of the at least one telescoping member are slidably coupled to the slidable plate. The slidable plate is slidably received in the body, and at least a part of the slidable plate is capable of sliding out of the body.

7 Claims, 4 Drawing Sheets

ELECTRONIC DEVICE

BACKGROUND

1. Technical Field

The disclosure generally relates to electronic devices, and particularly to an electronic device having a body and a cover movably coupled to the body.

2. Description of Related Art

Portable electronic devices, such as notebooks, are widely used in people's daily life. A notebook generally includes a cover and a body. A display module may be mounted in the cover. The cover is rotatable relative to the body to switch between a folded position and an unfolded position. The unfolded position is adjustable. In use, users can adjust rotation angles of the cover to set a suitable unfolded position according to personal requirements. However, users cannot adjust the vertical height and horizontal spacing of the cover relative to the body. Therefore, what is needed is an electronic device capable of overcoming or alleviating the above shortcomings.

BRIEF DESCRIPTION OF THE DRAWINGS

The components of the drawings are not necessarily drawn to scale, the emphasis instead being placed upon clearly illustrating the principles of the embodiments of an electronic device. Moreover, in the drawings, like reference numerals designate corresponding parts throughout several views.

DETAILED DESCRIPTION

Figure 1:
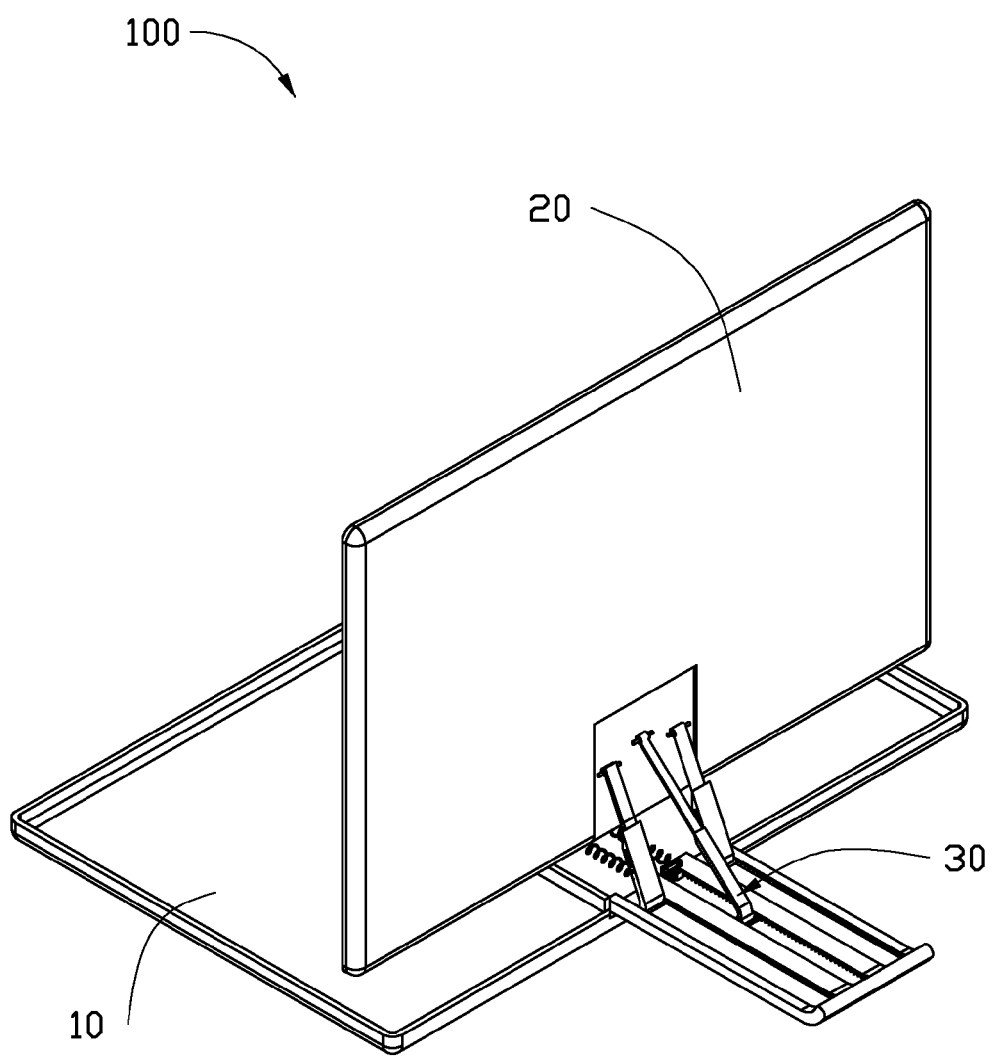
FIG. 1 is a perspective view of an electronic device in accordance with one embodiment.
Figure 2:
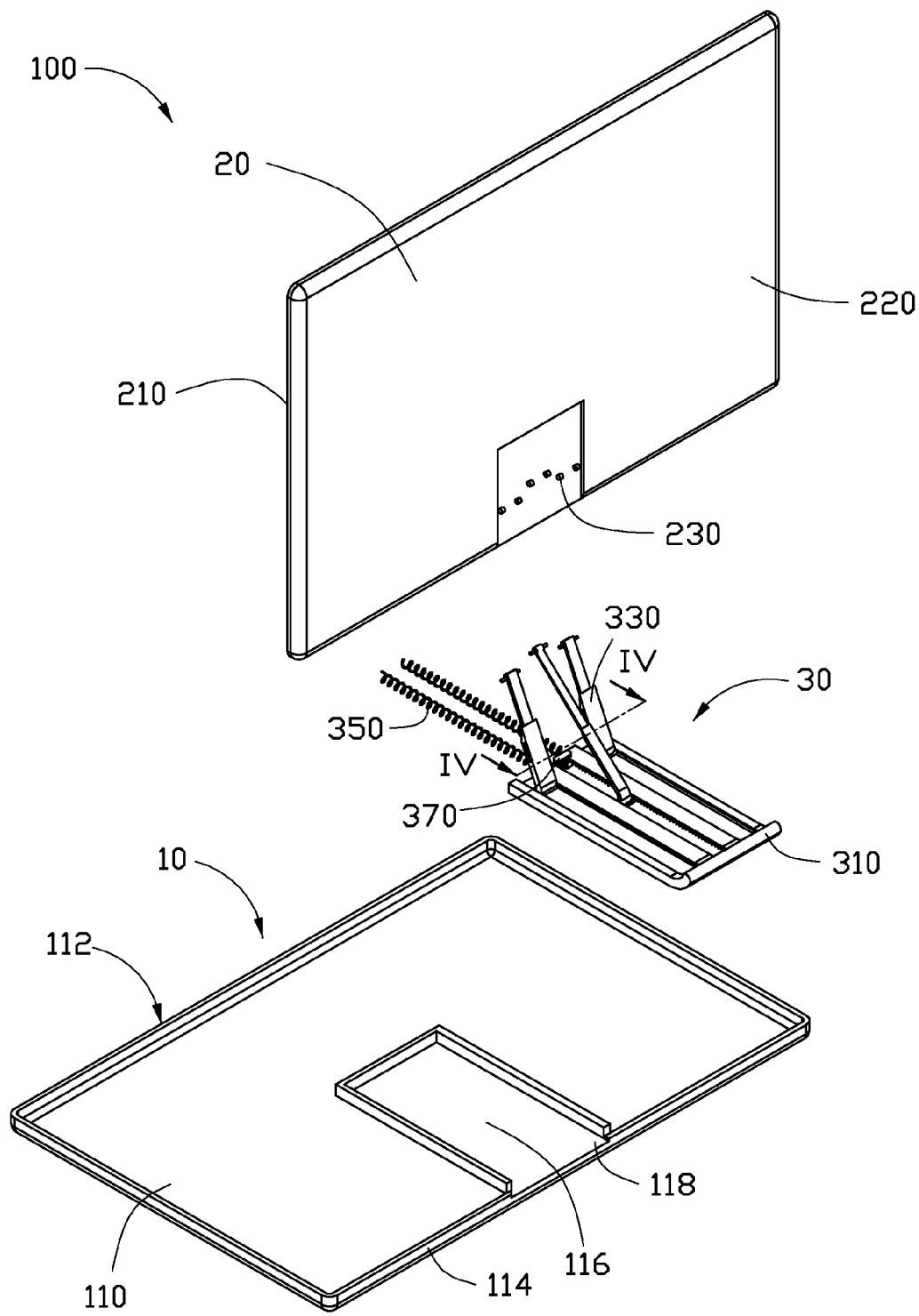
FIG. 2 is a partially exploded view of the electronic device of FIG. 1, the electronic device having a sliding mechanism.

Referring to FIGS. 1-2, an electronic device 100 includes a body 10, a cover 20, and a sliding mechanism 30. The sliding mechanism 30 is rotatably coupled to the cover 20, and is slidably received in the body 10. A length of the sliding mechanism 30 is changeable, thus, when the sliding mechanism 30 slides out of the body 10, the vertical height as well as the horizontal spacing of the cover 20 relative to the body 10 is adjustable. In the embodiment, the electronic device 100 is a portable electronic device, such as a notebook computer.

The body 10 is substantially rectangular. The body 10 includes a base 110 and a cover-plate (not shown) covering on the base 110. The base 110 cooperates with the cover-plate to form a receiving space (not shown). The receiving space is configured to accommodate pluralities of hardware of the electronic device 100, such as a hard-disk and main board. The base 110 includes a front sidewall 112 and a rear sidewall 114 opposite to the front sidewall 112. The base 110 defines a receiving groove 116. The receiving groove 116 receives the sliding mechanism 30. An end of the receiving groove 116 adjacent to the rear sidewall 114 of the base 110 defines an opening 118. The sliding mechanism 30 slides in and out of the body 10 via the opening 118.

The cover 20 is substantially rectangular. The cover 20 includes a front surface 210 and a rear surface 220 opposite to the front surface 210. A display (not shown) is mounted in the front surface 210. Three pairs of bearings 230 are located at the rear surface 220. The cover 20 is rotatably coupled to the sliding mechanism 30 via the bearings 230.

Figure 3:
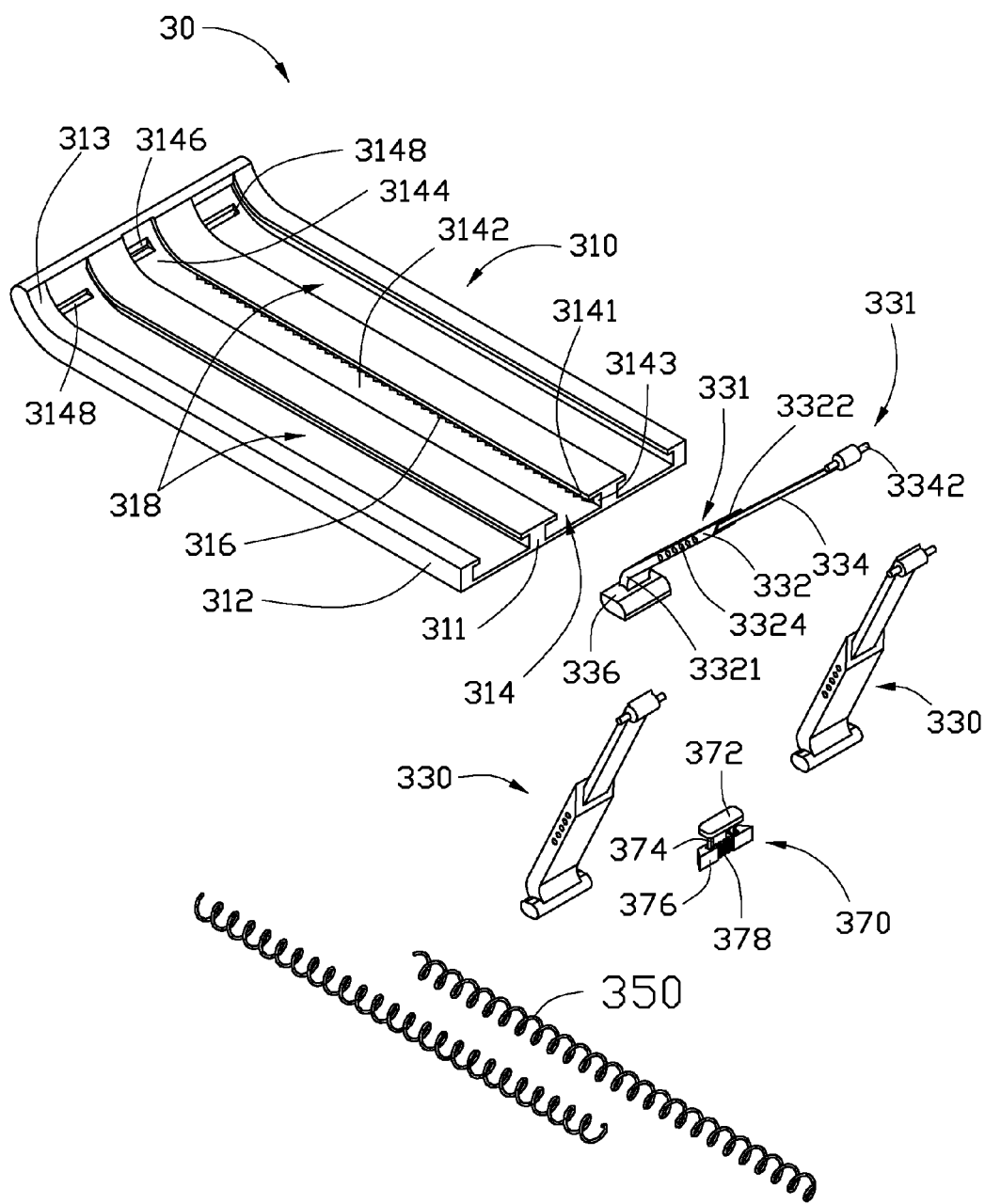
FIG. 3 is an exploded view of the sliding mechanism of the electronic device shown in FIG. 2.

Referring also to FIG. 3, the sliding mechanism 30 includes two identical telescoping members 330 and a third telescoping member 331, a slidable plate 310, two first elastic elements 350, and a latching portion 370. The cover 20 is rotatably coupled to the sliding mechanism 30 via the bearings 230 cooperating with the telescoping members 330, 331. The telescoping members 330, 331 are slidable relative to the slidable plate 310. The slidable plate 310 is slidably received in the receiving groove 116, and is further elastically connected to the end of the receiving groove 116 (see FIG. 2) opposite to the opening 118 via the two first elastic elements 350.

The slidable plate 310 is substantially J-shaped. The slidable plate 310 includes a front end 311 connected to an end of the first elastic element 350, and two opposite second sidewalls 312 perpendicular to the front end 311. An end of the slidable plate 310 opposite to the front end 311 is curved to form a curved portion 313. A first sliding groove 314 is defined in the middle of the slidable plate 310. The first sliding groove 314 extends from the front end 311 to an end of the curved portion 313 opposite to the front end 311. The first sliding groove 314 defines a narrower portion 3141 and a wider portion 3143 communicating with the narrower portion 3141. The width of the wider portion 3143 is larger than that of the narrower portion 3141. The first sliding groove 314 includes a first sliding portion 3142 parallel to the second sidewall 312 and a second sliding portion 3144 arranged at the curved portion 313. Two opposite inner surfaces 316 of the first sliding portion 3142 are toothed. The toothed surfaces 316 are parallel to each other, and are parallel to the second sidewalls 312. A recess 3146 is defined in the curved portion 313.

Two second sliding grooves 318 are also defined in the slidable plate 310. The second sliding grooves 318 are parallel to and symmetrically arranged at opposite sides of the first sliding groove 314. Each second sliding groove 318 is similar to the first sliding groove 314 but without toothed surfaces. The difference between the first and second sliding grooves 314, 318 is that each has a recess 3148 similar to the recess 3146 but defined farther away from the front end 311.

The telescoping members 330, 331 are configured to support the cover 20. The shape of the telescoping members 330, 331 is similar. The difference between the telescoping members 330 and the telescoping member 331 is that the telescoping member 331 is narrower at one end to avoid engaging with the toothed surfaces 316, and is capable of telescoping further than the telescoping members 330. In the following description, for simplicity, only the telescoping member 331 is selected to be described in detail.

The telescoping member 331 includes a positioning portion 332, an adjustable portion 334, and a sliding block 336. The adjustable portion 334 is slidably received in the positioning portion 332. The sliding block 336 is rotatably coupled to an end of the positioning portion 332 opposite to the adjustable portion 334.

The positioning portion 332 is substantially J-shaped. An end of the positioning portion 332 defines an arcuate portion 3321. The arcuate portion 3321 is opposite to the adjustable portion 334. The sliding block 336 is rotatably couple to the arcuate portion 3321 via a hinge (not shown). When the sliding block 336 rotates relative to the positioning portion 332, the positioning portion 332 is frictionally held at a desired angle to the slidable plate 310. The position portion 332 defines a receiving slot 3322 for slidably receiving the adjustable portion 334. One sidewall of the positioning portion 332 further defines a plurality of through holes 3324. The through holes 3324 connect with the receiving slot 3322.

The adjustable portion 334 is slidably received in the receiving slot 3322 of the positioning portion 332. A pivoting rod 3342 is mounted at an end of the adjustable portion 334 opposite to the positioning portion 332. The pivoting rod 3342 is rotatably coupled to the corresponding bearings 230, such that the cover 20 is rotatably coupled to the sliding mechanism 30. A plurality of pinholes (not shown) is defined in one sidewall of the adjustable portion 334 corresponding to the through holes 3324. A fastener (not shown) passes through one of the through holes 3324 and threadedly engages with one of corresponding pinholes, such that the adjustable portion 334 is latched to the positioning portion 332.

The sliding block 336 is slidably received in the first sliding groove 314. Sliding friction is generated when the telescoping member 331 slides along the sliding groove 314, such that the telescoping member 331 is located in a desired position.

Furthermore, a first contour (not shown) defined by the curved portion 313 matches a contour of the rear sidewall 114 of the body, and a second contour (not shown) defined by the arcuate portion 3321 matches the contour of the cover 20, such that, when the cover 20 covers on the body 10, the body 10 and the cover 20 are aligned with each other.

Figure 4:
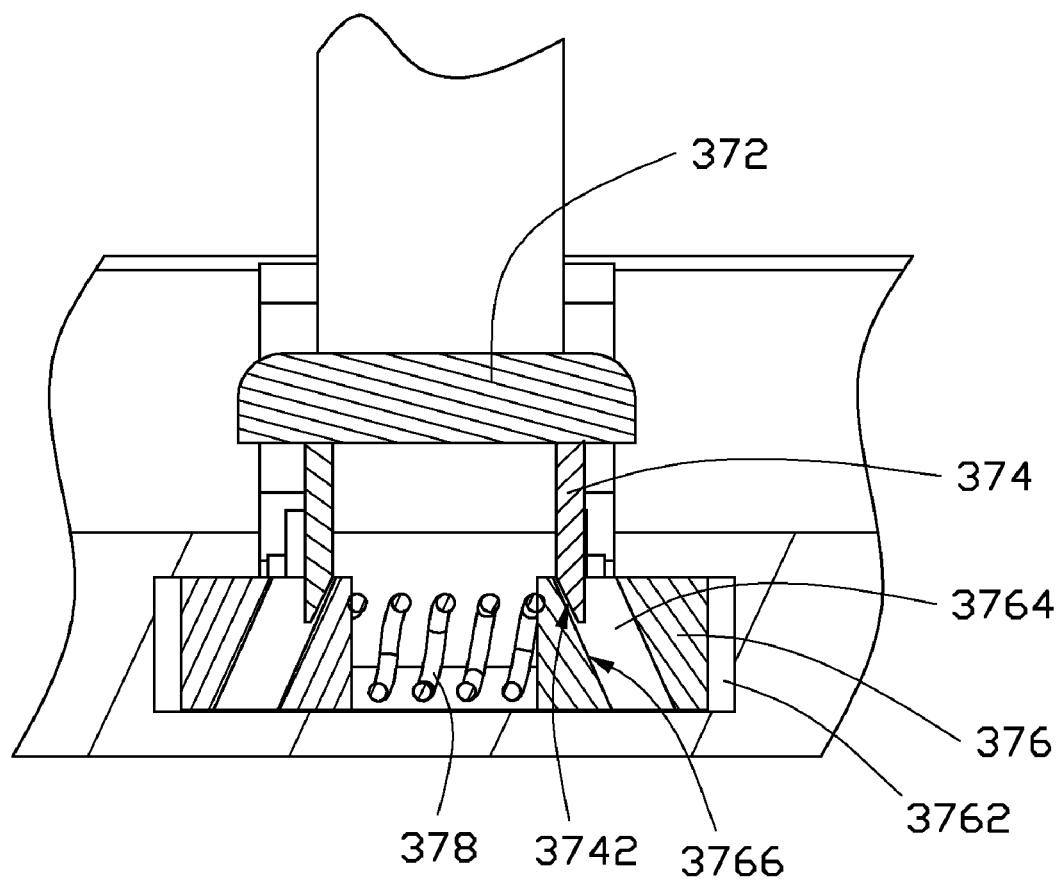
FIG. 4 is a cross-sectional view taken along the line IV-IV of FIG. 2.

Referring also to FIG. 4, a latching portion 370 (see FIG. 3) is fixed to the body 10, and is received in the first sliding groove 314. The latching portion 370 engages with the toothed surfaces 316 to latch the slideable plate 310 to and unlatch the slideable plate 310 from the body 10.

The latching portion 370 includes an operating member 372, two posts 374, two latching members 376, and a second elastic element 378. The posts 374 are fixed to opposite ends of the operating member 372. The other end of each post 374 opposite to the operating member 372 defines a first inclined surface 3742. The two latching members 376 are coupled to each other via the second elastic element 378. Each latching member 376 includes a protrusion 3762 engagable with the corresponding toothed surface 316. Each latching member 376 further defines an inclined recess 3764. The inclined recess 3764 defines a second inclined surface 3766, and is configured to receive an end of the post 374 opposite the operating member 372. The first inclined surface 3742 engages with the second inclined surface 3766, such that when the operating member 372 is pressed downwardly the two latching members 376 is driven to approach each other. Thus, the second elastic element 378 deforms elastically, and the protrusion 3762 is unlatched from the corresponding toothed surfaces 316. As a result, the slidable plate 310 is unlatched from the body 10, and is capable of sliding in and out of the body 10. When the operating member 372 is released, the second elastic element 378 rebounds to drive the latching member 376 to engage with the toothed surfaces 316, and the slidable plate 310 is latched to the body 10.

Furthermore, because the slidable plate 310 is coupled to the body 10 via the first elastic element 350, the first elastic element 350 deforms elastically when the latching portion 370 is unlatched from the slidable plate 310 to allow the slidable plate 310 to slide out of the body 10, and the slidable plate 310 is driven to slide in the body 10 by virtue of the elastic energy of the deformed first elastic element 350

Referring back to FIG. 1, after assembly, to open the electrical device 100, firstly, press the latching portion 370, and the slidable plate 310 slides out of the body 10. Then, rotate the cover 20 together with the positioning portion 332 to a desired angle. The adjustable portion 334 is slidable relative to the positioning portion 332, thus, the vertical height of the cover 20 relative to the body 10 is adjustable. In addition, because the sliding block 336 is slidable in the receiving grooves 314, 318 in a horizontal direction, the horizontal spacing of the cover 20 relative to the body 10 is adjustable.

Therefore, the cover 20 is adjustable both horizontally and vertically.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device, comprising:
a cover;
a body; and
a sliding mechanism connecting the cover to the body, the sliding mechanism comprising a slidable plate and at least one telescoping member, wherein each of the at least one telescoping member comprises a positioning portion, an adjustable portion, and a sliding block, the adjustable portion is slidable received in the positioning portion to allow a length of the telescoping member to be changeable and is able to be fastened to the positioning portion via a fastener to keep the length of the telescoping member fixed, the sliding block is rotatably coupled to an end of the positioning portion opposite to the adjustable portion, and is further slidable received in the slidable plate, the cover is rotatably coupled to an end of the adjustable portion opposite to the positioning portion; and
at least a part of the slidable plate is capable of sliding out of the body, when the at least a part of the slidable plate slides out of the body, the slidable plate cooperates with the at least one telescoping member to support the cover in a position relative to the body.

2. The electronic device as described in claim 1, wherein the body defines a receiving groove, the slidable plate is slidably received in the receiving groove, and the at least a part of the slidable plate is capable of sliding out of the receiving groove.

3. The electronic device as described in claim 2, wherein the receiving groove defines an opening, the slidable plate slides out of the receiving groove via the opening.

4. The electronic device as described in claim 1, wherein the sliding mechanism further comprises at least one elastic element, the slidable plate is further coupled to the body via the at least one elastic element.

5. The electronic device as described in claim 1, wherein the slidable plate defines at least one sliding groove, the sliding block of the each of the at least one telescoping member is slidably received in the at least one sliding groove.

6. The electronic device as described in claim 5, wherein each of the at least one sliding groove defines a narrower portion and a wider portion, the narrower portion communicates with the wider portion, and the width of the wider portion is larger than that of the narrower portion.

7. The electronic device as described in claim 6, wherein two toothed surfaces are disposed at opposite inner surfaces of each of the at least one sliding groove.

* * * * *